United States Patent Office 3,065,214
Patented Nov. 20, 1962

3,065,214
CROSS-LINKED REACTION PRODUCT OF TETRA-FLUOROETHYLENE AND TRIFLUORONITROSOMETHANE AND PROCESS THEREOF
John Brewster Rose, Welwyn Garden City, England, assignor to Imperial Chemical Industries Limited, London, England, a corporation of Great Britain
No Drawing. Filed Oct. 12, 1956, Ser. No. 615,487
Claims priority, application Great Britain Oct. 24, 1955
5 Claims. (Cl. 260—92.1)

This invention relates to new polymeric materials and their production.

According to the present invention we provide normally solid copolymers of equimolar quantities of trifluoronitrosomethane and tetrafluoroethylene and a process for their production which comprises reacting together in the absence of oxygen equimolar quantities of trifluoronitrosomethane and tetrafluoroethylene and holding the reaction mixture at a temperature above 20° C. until a solid product is formed.

The initial polymerisation reaction of this invention is preferably conducted in the absence of alkalis and of ultra violet light as these decompose trifluoronitrosomethane.

I prefer that the mixture of trifluoronitrosomethane and tetrafluoroethylene is initially reacted at a temperature of from −20° C. to −50° C. until an oil is formed. In this way satisfactory yields of copolymer are obtained in relatively short reaction periods. Also the reaction can be conveniently effected in the liquid phase at these temperatures. Suitable reaction periods at these temperatures range from 10 hours at the higher temperatures to 150 hours at the lower temperatures. The period of further treatment of the reaction mixture also depends upon the temperature of treatment. Thus, for temperatures of treatment from 30°–200° C. times of treatment that are suitable fall from 400 to 20 hours. Preferred temperatures of treatment are 70-100° C.

The solid, high molecular copolymers of our invention are rubber-like bodies possessing excellent resistance to heat and to the action of solvents and chemical attack. The presence of cross-linkages in the solid copolymer molecules is indicated by the fact that whereas the copolymer oils initially formed are completely soluble in perfluoromethylcyclohexane ($C_7F_{14}$) the solid copolymers show only limited solubility.

My invention is illustrated but not limited by the following examples.

*Example 1*

Equimolar quantities of trifluoronitrosomethane and tetrafluoroethylene were condensed, in vacuo, into a thick-walled glass tube having a volume such that the monomers were liquefied at the reaction temperature. The quantities of monomers used were accurately measured by means of a constant-volume, variable-pressure gas burette built into the vacuum apparatus. The tube was surrounded by a methyl chloride bath at −24° C. for a period of 15 hours. Reaction between the monomers occurred yielding a viscous oil. The unopened tube was then heated at 40° C. for 10 days and at the end of this period all volatile materials were pumped out of the tube. A solid rubbery polymer was obtained which was extremely inert and did not appear to be soluble in common, non-fluorinated solvents, though it was partially soluble in perfluoromethylcyclohexane. It was unaffected by prolonged heating at 200° C. in air.

*Example 2*

The above procedure was repeated but the copolymer oil first formed was heated at 80° C. for 40 hours. A similar rubbery solid was formed.

*Example 3*

The process of Example 1 was repeated but the initial reaction was carried out over a period of 4 days in a liquid propylene bath at −47° C. A similar rubbery polymer was obtained.

I claim:
1. A normally solid rubbery high molecular weight cross-linked resinous reaction product of tetrafluoroethylene and trifluoronitrosomethane which is partially soluble in perfluoromethylcyclohexane.
2. A process for the production of a coplymer which comprises reacting together in the absence of oxygen quantities of trifluoronitrosomethane and tetrafluoroethylene and holding the reaction mixture at a temperature between about 20° C. and 200° C. until a solid product is formed.
3. A process according to claim 2 in which the trifluoronitrosomethane and tetrafluoroethylene are initially reacted at a temperature of −20° C. to −50° C. for 10–150 hours until an oil is formed, and then heating the oil to a temperature of 20° C. to 200° C. until a solid product is formed.
4. A process according to claim 2 in which the reaction mixture is held at a temperature of 30° C.–200° C.
5. A process according to claim 4 in which the reaction mixture is held at a temperature of 70° C.–100° C., for 400–20 hours.

No references cited.